United States Patent

Pritchard et al.

[11] Patent Number: 4,602,278
[45] Date of Patent: Jul. 22, 1986

[54] NON-LINEAR PROCESSOR FOR VIDEO SIGNAL VERTICAL DETAIL COMPONENT

[75] Inventors: Dalton H. Pritchard, Princeton Township, Mercer County; Donald J. Sauer, Plainsboro Township, Middlesex County, both of N.J.

[73] Assignee: RCA Corporation, Princeton, N.J.

[21] Appl. No.: 555,587

[22] Filed: Nov. 28, 1983

[51] Int. Cl.⁴ .............................................. H04N 9/64
[52] U.S. Cl. ...................................... 358/37; 358/31; 358/36; 358/166; 358/167
[58] Field of Search ...................... 358/31, 36, 37, 166, 358/167, 184, 315; 328/142, 143

[56] References Cited
U.S. PATENT DOCUMENTS 4,262,304  4/1981  Faroudja .............................. 358/37
4,295,160  10/1981 Lagoni ................................ 358/31

FOREIGN PATENT DOCUMENTS 1428963  3/1976  United Kingdom .

Primary Examiner—James J. Groody
Assistant Examiner—Michael P. Dunnam
Attorney, Agent, or Firm—P. J. Rasmussen; P. M. Emanuel; R. H. Kurdyla

[57] ABSTRACT

In a television receiver, apparatus for non-linearly processing a vertical detail signal includes a plurality of cascaded amplifier stages responsive to an input vertical detail signal and which exhibit linear and limiting operating regions. Vertical detail signals from the amplifiers are translated and combined with a linear version of the input vertical detail signal. The combined vertical detail signal exhibits a characteristic wherein small amplitude excursions within a first amplitude range are cored, moderate amplitude excursions within a second amplitude range are amplified with a given non-zero gain, and large amplitude excursions within a third amplitude range are pared (attenuated).

3 Claims, 6 Drawing Figures

NON-LINEAR PROCESSOR FOR VIDEO SIGNAL VERTICAL DETAIL COMPONENT

This invention concerns apparatus for non-linearly processing vertical detail information signals such as may be derived from an output of a comb filter used in a television receiver for separating the luminance and chrominance components of a color television signal. In particular, this invention concerns apparatus for providing coring and paring of vertical detail signals.

In a color television system such as used in the United States, the luminance and chrominance components of a color television signal are disposed within the video signal spectrum in frequency interleaved relation, with the luminance components at integral multiples of the horizontal line scanning frequency and the chrominance components at odd multiples of one-half the line scanning frequency. The luminance and chrominance components are sometimes separated from each other in the color television signal by means of a comb filter, e.g., of the type described in U.S. Pat. No. 4,096,516 of D. H. Pritchard.

A combed luminance signal which appears at the luminance output of the comb filter has been subjected to a "combing" effect over its entire band. The combing action over the high frequency band portion which is shared with chrominance signal components has the desired effect of deleting chrominance signal components. Extension of this combing action into the low frequency band portion is not needed to effect the desired removal of chrominance signal components, and serves to delete luminance signal components. Components in the lower frequency end of this band which are subject to such deletion are representative of "vertical detail" luminance information. Preservation of such vertical detail information is desirable to avoid loss of vertical resolution in the luminance content of a displayed image.

One arrangement for preserving the vertical detail information employs a low pass filter coupled to the output of the comb filter at which the "combed" chrominance component appears. The upper cut-off frequency of this filter lies below the band occupied by the chrominance signal component. The filter selectively couples signals below the chrominance band from the chrominance output of the comb filter to a combining network where the selectively coupled signals are summed with the combed luminance output signal from the comb filter. The combined signal includes a "combed" high frequency portion (occupying a band of frequencies above the filter cut-off frequency) from which chrominance signal components have been removed, and an uncombed (i.e., "flat") low frequency portion in which all luminance signal components have been preserved.

It is sometimes desirable to minimize the adverse effects of both noise and interference including co-channel interference upon a reproduced image without unduly degrading the detail of a reproduced image. This can be accomplished by means of a process commonly referred to as signal "coring", wherein small amplitude excursions of the signal (including noise) are removed. More specifically, coring of a signal serves to remove a close-to-average-axis "core" of the signal by means of a translating circuit having a transfer characteristic with a "dead zone" for close-to-axis signal amplitude excursions. Signal coring is a known signal processing function occasionally used for noise reduction purposes as explained, for example, in an article by J. P. Rossi titled "Digital Techniques for Reducing Television Noise", appearing on pages 134–140 of the March, 1978 issue of the SMPTE Journal.

It is also sometimes desirable to selectively reduce the magnitude of large video signal amplitude excursions by means of a process sometimes referred to as signal "paring". Signal paring serves to prevent "blooming" of a reproduced video image and thereby prevents image detail from being distored or obscured. U.S. Pat. No. 4,295,160 of W. A. Lagoni describes vertical detail signal processing apparatus for producing a non-linear transfer characteristic such that small signal amplitude excursions are "cored", and large signal amplitude excursions are "pared". This is accomplished by means of a circuit including a feedback network with diode switched impedances coupled from the output to the input of an amplifier which receives vertical detail input signals. The conductive states of the diodes are controlled in accordance with the magnitude of vertical detail signals applied to the amplifier, for thereby varying the magnitude of the feedback impedance selectively with respect to given detail signal amplitude ranges.

It is herein recognized as desirable to incorporate vertical detail signal processing apparatus in the same integrated circuit as the comb filter, particularly a charge coupled device (CCD) comb filter employing MOS semiconductor technology, from an output of which the vertical detail signal is divided. It is furthermore recognized as desirable to provide such detail signal processing apparatus with a predictable non-linear transfer function which does not rely on the sometimes unpredictable threshold switching levels of switching devices such as diodes.

Non-linear vertical detail signal processing apparatus disclosed herein in accordance with the principles of the present invention includes a plurality of cascaded amplifier stages comprising a vertical detail signal amplifying path. Selected amplitude portions of non-linearly processed vertical detail output signals from the amplifiers are combined with a linear version of the input vertical detail signal. The combined vertical detail signal exhibits a characteristic wherein (a) small amplitude excursions within a first amplitude range are cored to remove small amplitude excursions, (b) moderate amplitude excursions within a second amplitude range are translated with a given amplification greater than zero, and (c) large amplitude excursions within a third amplitude range are pared, or attenuated.

Figure 1:
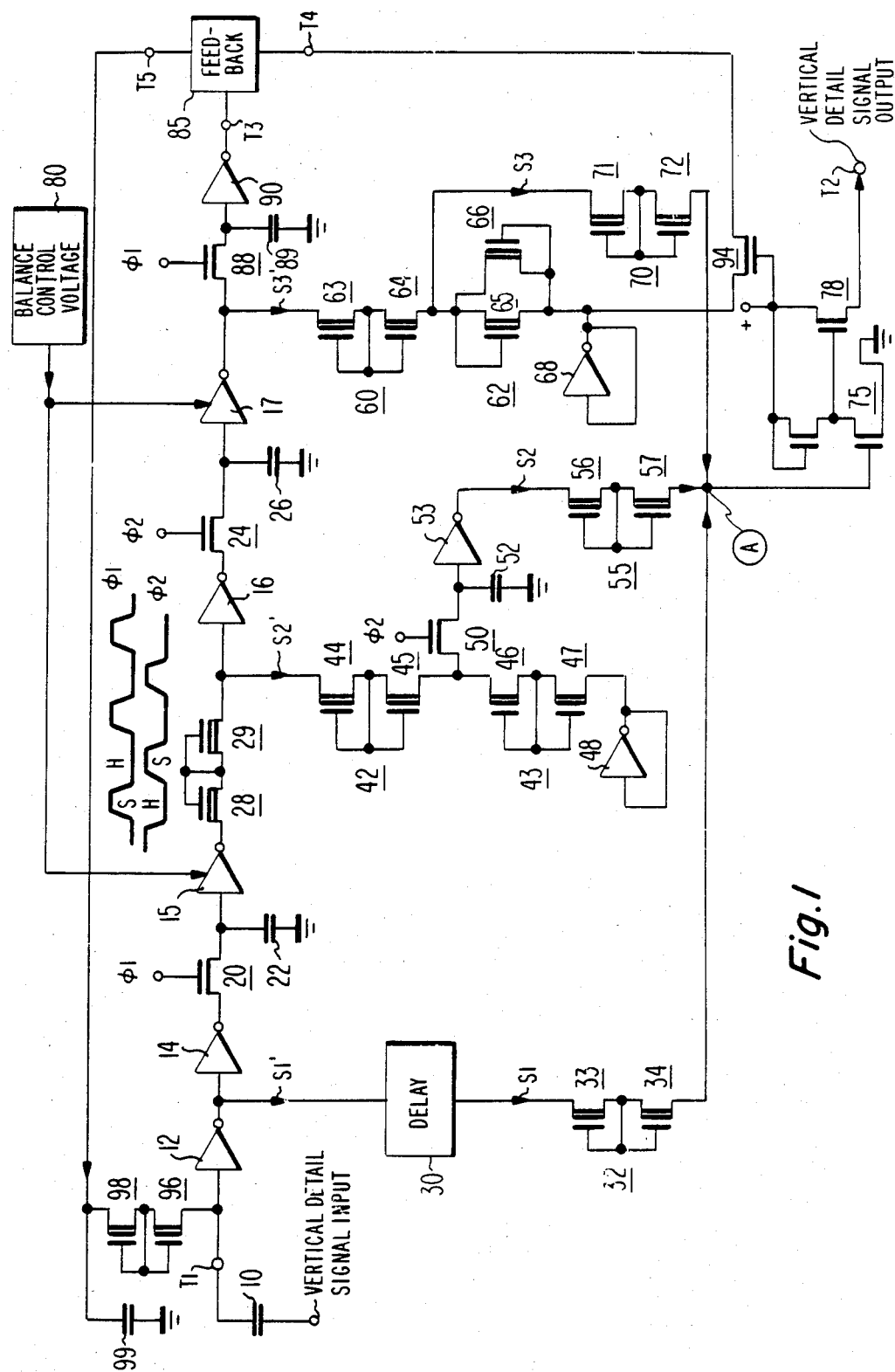
FIG. 1 shows vertical detail signal processing apparatus, partly in block form and partly in schematic circuit diagram form, in accordance with the principles of the present invention.

In FIG. 1, vertical detail signals as derived from an output of a comb filter (as will be seen in FIG. 6) are AC coupled via a capacitor 10 to an input terminal T1 of a non-linear vertical detail signal processor circuit. The vertical detail signal processor comprises NMOS semiconductor elements constructed as an integrated circuit on a common semiconductor substrate with the comb filter arrangement.

An input inverting buffer amplifier 12 couples vertical detail signals to a main signal amplifying path including a plurality of cascaded inverting amplifiers 14-17 which exhibit similar signal gains. A sample and hold circuit comprising a keyed enhancement mode NMOS switching device 20 and a charge storage capacitance element 22 is coupled between amplifiers 14 and 15. Switch 20 has a source input electrode coupled to the output of amplifier 14, a drain output electrode coupled to capacitance element 22 and the input of amplifier 15, and a gate electrode which receives keying signals $\phi 1$ for controlling the conductive state of switch 20. Similarly, a keyed NMOS sample and hold circuit comprising a keyed switch 24 responsive to a keying signal $\phi 2$, and a storage capacitance element 26, is coupled between the output of amplifier 16 and the input of amplifier 17. Keying signals $\phi 1$ and $\phi 2$, illustrated by the waveforms, exhibit a frequency of 10.7 MHz, which corresponds to three times the frequency of the subcarrier component of the television signal chrominance component for NTSC television standards. The phase relationship of switching signals $\phi 1$ and $\phi 2$ differ in that signals $\phi 1$ and $\phi 2$ effect signal sampling (S) and holding (H) at different times, i.e., switch 24 is enabled for sampling purposes at times (S of $\phi 2$) corresponding to holding intervals (H of $\phi 1$) for preceding sample and hold network 20, 22. Thus sampling network 24, 26 "resamples" the signal sample provided by preceding sampling network 20, 22. A series resistance element coupled between amplifiers 15 and 16 comprises interconnected NMOS devices 28 and 29 arranged as shown. This resistance assists to establish a desired signal gain in the main signal path from the input of amplifier 14 to the output of amplifier 17.

Figure 2:
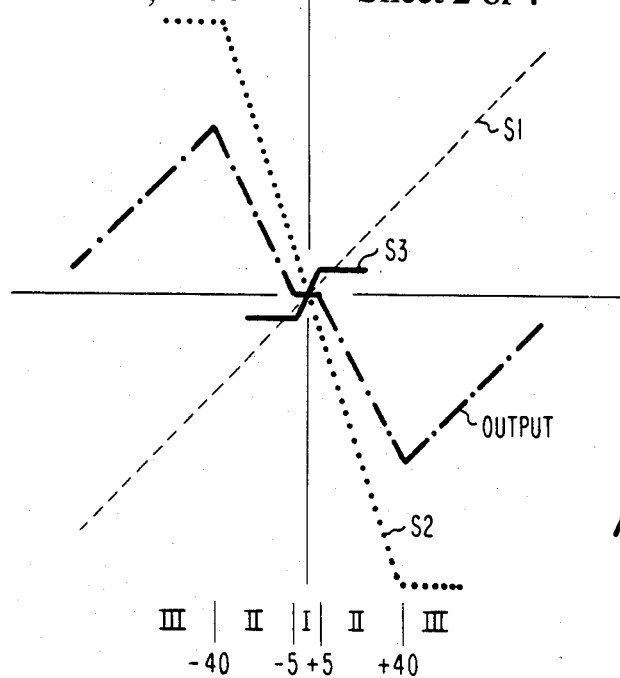
FIG. 2 illustrates signal transfer characteristics produced by the apparatus of FIG. 1.

The following discussion is made with reference to FIG. 1 and the signal transfer characteristic shown in FIG. 2.

The vertical detail signal from the output of amplifier (12 (S1')) is coupled via a delay compensation network 30 and a resistance element 32 to a signal summing node A. Resistance element 32 is formed by series connected depletion mode NMOS devices 33, 34 with interconnected gate electrodes and series connected drain-source conduction paths. The delayed vertical detail signal (S1) conveyed to node A via resistance element 32 exhibits a linear transfer characteristic as indicated in FIG. 2 for signal S1.

An amplified vertical detail signal (S2') from the output of amplifier 15 is amplitude translated by means of a voltage divider network formed by series resistance elements 42 and 43, each of which respectively comprises series connected NMOS devices 44, 45 and 46, 47. Associated with the voltage divider network is an inverter 48 with interconnected input and output terminals to develop at its low impedance output a reference potential from a supply voltage (not shown) which is applied to device 47. The translated vertical detail signal appearing at the junction of resistance elements 42, 43 is sampled by means of a network including an NMOS switch 50 responsive to keying signals $\phi 2$, and a charge storage capacitance element 52. The sampled and amplitude translated vertical detail signal is coupled to node A via an inverter 53 and a resistance element 55 comprising series connected NMOS devices 56, 57. The translated vertical detail signal, S2, conveyed by resistance 55 to node A exhibits a non-linear transfer characteristic as indicated in FIG. 2 for signal S2.

A further amplified vertical detail signal (S3') from the output of amplifier 17 is amplitude translated by means of a voltage divider network formed by series resistance elements 60 and 62, each of which respectively comprises NMOS devices 63, 64 and 65, 66 arranged as shown. A reference potential for this voltage divider is provided from the low impedance output of an inverter 68 having interconnected input and output terminals. The translated vertical detail signal appearing at the junction of resistance elements 60 and 62 is coupled to node A via a resistance element 70 comprising series connected NMOS devices 71 and 72. The translated vertical detail signal, S3, conveyed by resistance 70 to Node A exhibits a non-linear transfer characteristic as indicated in FIG. 2 for signal S3.

The combined transfer characteristics of signals S1, S2 and S3 produce a composite "output" transfer characteristic at node A, as indicated in FIG. 2. Vertical detail signals from node A are conveyed to a vertical detail signal output terminal T2 via an NMOS amplifier stage including a device 75, and an output NMOS voltage follower device 78 the load circuit for which is constituted by utilization circuits coupled to terminal T2.

The "output" composite transfer characteristic for the vertical detail signal at mode A exhibits three operating regions with respect to three predetermined ranges of vertical detail signal amplitude levels. In FIG. 2 these regions are designated as regions I, II and III.

Region I encompasses small vertical detail signal amplitudes of between 0 and +5 IRE units and between 0 and −5 IRE units. For such small signal amplitudes the output vertical detail signal is "cored", or processed with substantially zero signal gain, so as to remove objectionable noise components. Coring is produced by the signal cancelling effect of the transfer characteristics for signals S1, S2 and S3 over region I. Beyond Region I, the transfer characteristic for signal S3 exhibits an amplitude limiting effect produced by amplifier 17 in FIG. 1 operating in an amplitude limiting mode.

Region II encompasses vertical detail signals of moderate amplitude, of between +5 and +40 IRE and between −5 and −40 IRE as shown. For such moderate signal amplitudes the output vertical detail signal is processed with a signal gain greater than zero, e.g., unity. However, in this region the vertical detail signal can be amplified with greater gain, e.g., with a gain of two or three, to provide enhancement or "peaking" of vertical detail signal amplitudes in region II in accordance with the requirements of a particular system. Such amplitude peaking is undesirable with respect to small signal amplitudes in region I, since peaking signals in region I would undesirably include peaked noise components. The output signal amplitude response over region II is primarily determined by the linear portions of the transfer characteristics associated with signals S1 and S2, with some contribution from the transfer characteristic associated with signal S3 in region II. Beyond region II, i.e., above 40 IRE, the transfer characteristic for signal S2 exhibits an amplitude limiting effect produced by amplifier 15 in FIG. 1 operating in an amplitude limiting mode. The amount of signal gain imparted to vertical detail signals in region II can be tailored by adjusting the signal processing parameters associated with the processing of signal S2.

Region III encompasses large amplitude vertical detail signals of greater than +40 and "40 IRE. Such large vertical detail signal amplitudes are processed with a signal gain of less than zero, i.e., with a negative signal gain, to produce attenuation, or "paring" of signal amplitudes in region III. Attenuation of such large amplitude vertical detail signals is desirable to prevent "blooming" of a reproduced video image, thereby preventing image detail from being distorted or obscured. In region III, amplifier 15 operates in an amplitude limiting mode, together with amplifiers 16 and 17.

Thus it is seen that the vertical detail signal processor comprises three signal channels the outputs of which are combined at node A. The first signal channel, associated with signal S1', constitutes a linear signal processing channel from the output of amplifier 12 and node A. The second signal channel, associated with signal S2', exhibits linear and non-linear (i.e. amplitude limiting) regions and constitutes the signal path from the output of amplifier 12 to node A which includes amplifier 15, voltage divider 42, 43 and inverter 53. This signal channel exhibits a linear region for small and moderate amplitude signals over regions I and II respectively, and a limiting region for large amplitude signals over region III due to the operation of amplifier 15 in an amplitude limiting mode in response to such large amplitude signals. The third signals channel, associated with signal S3', also exhibits linear and non-linear (limiting) regions and constitutes the signal path from the output of amplifier 12 to node A which includes amplifier 17 and voltage divider 60, 62. This signal channel exhibits a linear region for small amplitude signals over region I, and a limiting region for moderate and large amplitude signals over regions II and III due to the operation of amplifier 17 in an amplitude limiting mode in response to such moderate and large amplitude signals. Voltage divider 42, 43 and inverter 53 in the second channel, and voltage divider 60, 62 in the third channel, provide signals to node A with the appropriate magnitude and polarity such that the desired output signal is provided at node A when signals from the second and third channels are combined with signals from the first channel.

Sampling network 50, 52, as well as two sampling networks included in delay unit 30, as will be discussed in connection with FIG. 4, serve as signal transit delay equalizing elements to assure that equal signal transit delays are exhibited by processed vertical detail signals S1, S2 and S3 when combined at mode A. Specifically, each of signals S1, S2 and S3 appearing at node A has been subjected to two sampling operations, each with matching delays. Additional aspects of sampling networks 20, 22 and 24, 26 will be discussed subsequently.

A unit 80 provides a variable DC balance control voltage to amplifiers 15 and 17 for the purpose of balancing or "centering" the composite output transfer characteristic at node A with respect to vertical detail signal amplitude excursions. This adjustment is important for providing a symmetrical coring response in region I, particularly when the elimination of low level noise is critical.

The described non-linear vertical detail signal processor provides a predictable composite transfer characteristic over the vertical detail signal bandwidth of from DC to approximately 1 MHz, and can advantageously be constructed on the same integrated circuit as the MOS charge coupled device (CCD) comb filter from which the vertical detail signal is derived. The predictability of the transfer function is enhanced by the use of amplifiers of similar structure and operating characteristics, which can readily be realized in an integrated circuit. In addition to having similar gains, it is preferable for amplifiers 15–17 to exhibit similar absolute values of peak-to-peak limited amplitude levels in the amplitude limiting mode. Moreover, the transfer characteristic, particularly in the amplitude limited regions, is primarily a function of the predictable gains of the amplifiers, and is substantially uninfluenced by switching thresholds and offsets associated with differences in amplifier switching thresholds. Also, the signal translation produced by voltage divider resistance elements 42, 43 and 60, 62 is a function of resistance ratios which can be accurately determined in an integrated circuit.

Sampling networks 20, 22 and 24, 26 prevent amplifiers 15–17 from saturating in response to switching transients associated with timing signals employed to time the operation of a CCD comb filter from which the vertical detail signal is derived. To this end sampling key signals $\phi 1$ and $\phi 2$ are timed to occur in synchronism with such comb filter timing signals such that signals $\phi 1$ and $\phi 2$ enable the sampling process during intervals when switching transients from such timing signals do not appear.

The use of sampled data signal processing by means of sampling networks 20, 22 and 24, 26 also substantially reduces the effect of signal distortion associated with amplifier slew rate limiting otherwise developed by linear (i.e., non-sampled data) signal processing of large high frequency signals. Such slew rate limiting distortion can significantly distort the output signal transfer function, and is particularly objectionable with respect to the desired coring response in region I.

Feedback network 85, as will be discussed in detail in connection with FIG. 3, includes a differential comparator with a signal input coupled to a terminal T3. Terminal T3 receives a sampled version of the output signal from amplifier 17 via a sampling network comprising a keyed sampling switch 88 and storage capacitance element 89, and an inverting amplifier 90. A reference voltage connected via a terminal T4 to a reference input of the comparator is derived via an NMOS coupling device 94 from the low impedance reference voltage output of inverter 68. An output terminal T5 of the comparator is coupled via a feedback path, including a resistance element comprising series NMOS devices 96, 98, to the input of buffer 12. The comparator output signal is integrated by means of a filter capacitor 99 coupled to the feedback path. The feedback network acts to stabilize the DC gain of the signal path including amplifiers 14–17. This result assists to maintain the accuracy of the coring characteristic developed with respect to small vertical detail signals in region I.

Additional information concerning feedback network 85 and sampling networks 20, 22 and 24, 26 is found in a copending, concurrently filed U.S. patent application Ser. No. 555,588) of D. J. Sauer titled "Sampled Data Vertical Detail Signal Processor."

Figure 3:
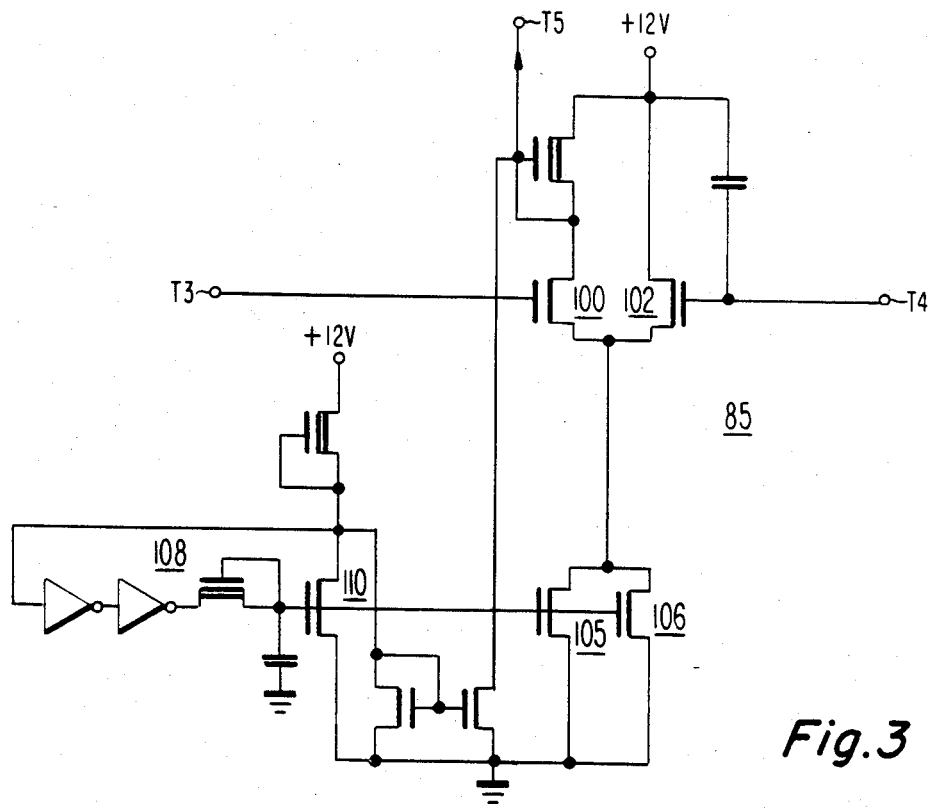
FIGS. 3–5 show circuit details of portions of the apparatus of FIG. 1.

The components of feedback network 85 in FIG. 1 are shown in FIG. 3. NMOS devices 100, 102 with interconnected source electrodes comprise a differential comparator wherein signal is applied to the gate electrode of device 100 via terminal T3 and a reference voltage is applied to the gate electrode of device 102 via terminal T4. Comparator output signals are developed in the drain circuit of device 100 and are coupled via terminal T5 to the feedback path. A current source for comparator devices 100, 102 comprises parallel NMOS devices 105, 106 in association with a feedback reference current source 108 including a device 110.

Figure 4:
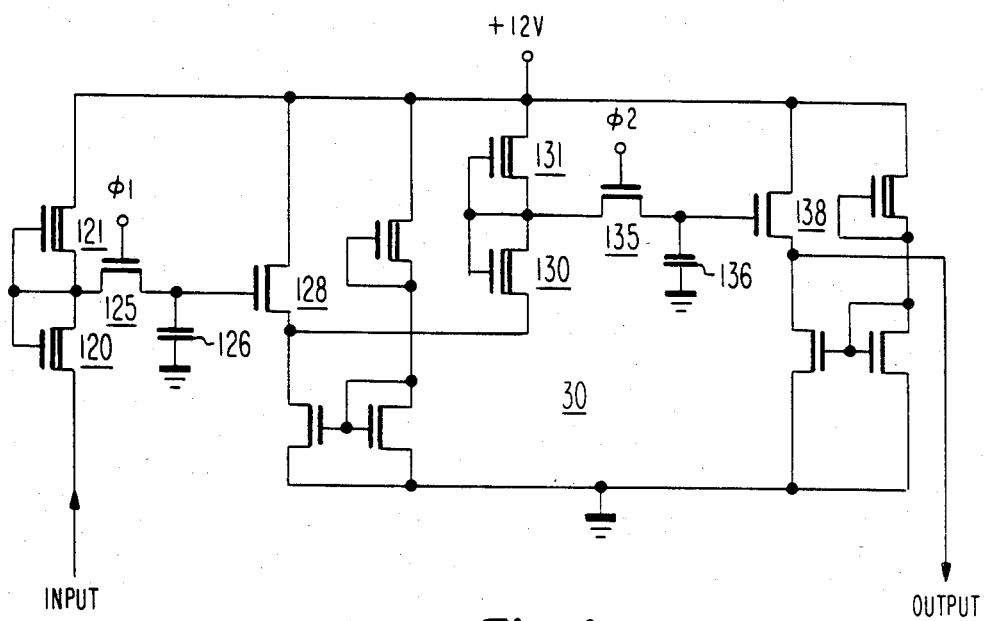

FIG. 4 shows details of delay compensation network 30 in FIG. 1. Input signals are applied to an input coupling circuit including NMOS devices 120, 121 and are sampled by means of a circuit including a keyed sampling switch 125 and storage capacitance element 126. The sampled signal is conveyed via a voltage follower device 128 and a coupling circuit 130, 131 to a second sampling circuit 135, 136 from which sampled signals are coupled to an output via a voltage follower device 138.

Figure 5:
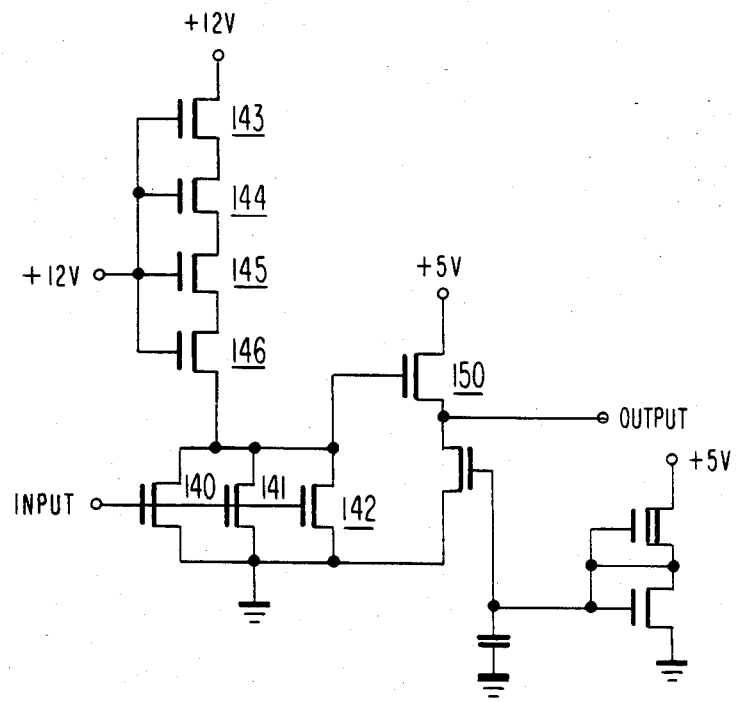

FIG. 5 illustrates the circuit configuration of the inverters (e.g., amplifiers) employed in FIG. 1. Input signals are applied in common to the gate electrodes of parallel connected, signal inverting NMOS devices 140-142 having as a common load network a plurality of series connected NMOS devices 143-146. Output signals developed across the common load network are coupled to an output via a voltage follower device 150.

Figure 6:
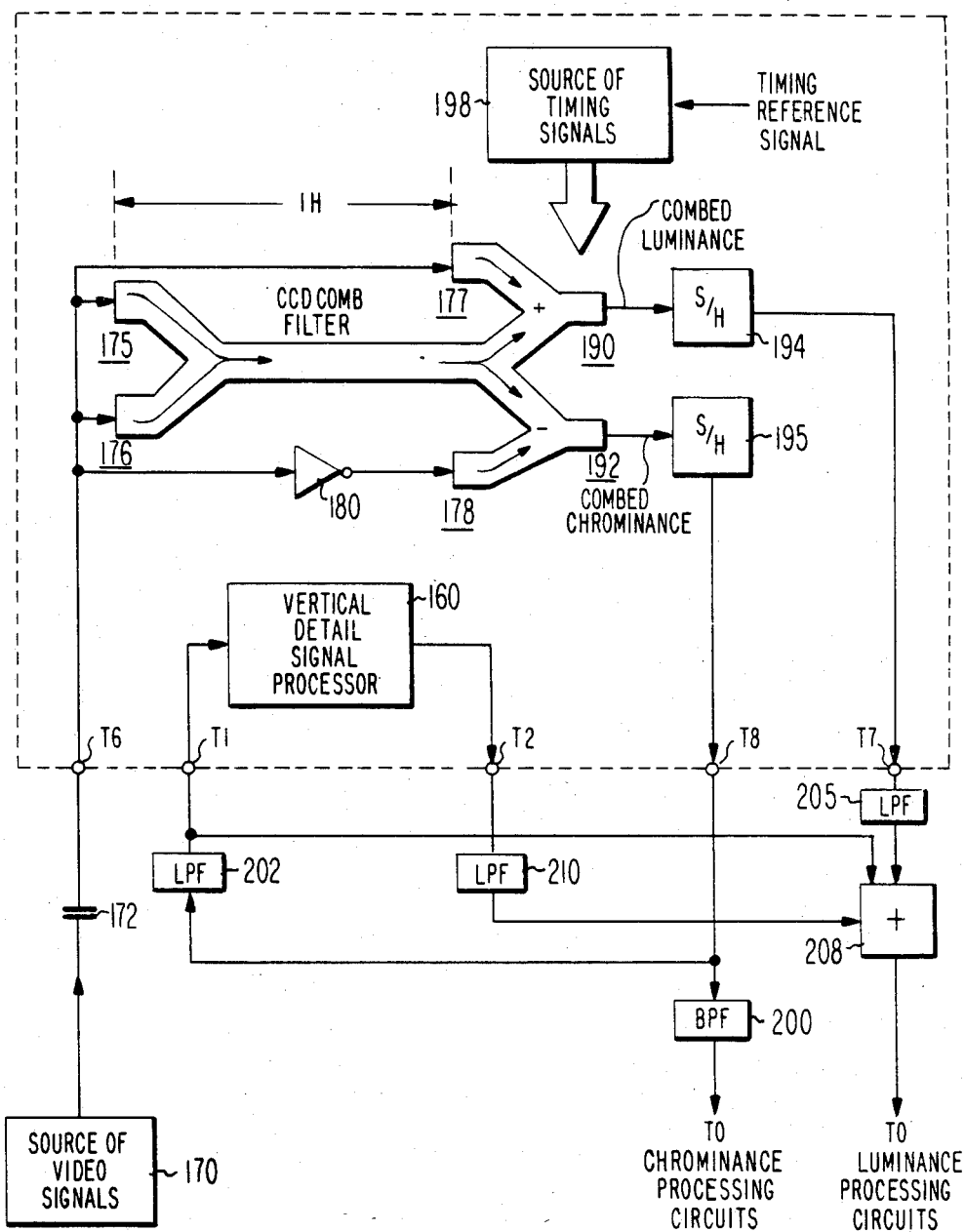
FIG. 6 illustrates the relationship of the apparatus of FIG. 1 to a comb filter which provides separated luminance and chrominance components of a color television signal.

FIG. 6 illustrates the arrangement of a non-linear vertical detail signal processor 160, corresponding to the apparatus shown in FIG. 1, in conjunction with a CCD comb filter system such as may be employed in a color television receiver. Vertical detail processor 160 and the CCD comb filter are both constructed on the same integrated circuit within the confines of the dashed outline.

Video signals including luminance and chrominance components from a source 170 are AC coupled via a capacitor 172 and a terminal T6 to "long line" inputs 175, 176 of a CCD comb filter device, and to "short line" inputs 177, 178 of the comb filter. Before being applied to input 178 the video signals are inverted by means of an inverter 180. As to the structure and operation of a CCD comb filter device, reference is made to the comb filter arrangements described in U.S. Pat. No. 4,096,516—Pritchard, U.S. Pat. No. 4,217,605—Carnes et al., and copending U.S. patent application Ser. No. 383,302 of D. J. Sauer filed May 28, 1982 and titled "CCD Charge Subtraction Arrangement."

A comb filter signal combining junction "+" combines signals (i.e., charge packets) which are mutually delayed by 1H, i.e., one horizontal line interval, to produce a combed luminance signal at a comb filter output 190. This is accomplished by means of an additive charge combining process at the "+" junction. A comb filter signal combining junction "−" combines signals which are mutually inverted and delayed by 1H to produce, via a subtractive charge combining process, a combed chrominance signal at a comb filter output 192. The combed luminance and chrominance signals are respectively sampled by means of sample and hold circuits 194 and 195, and sampled versions of the combed luminance and chrominance signals appear at terminals T7 and T8 respectively. Timing signals for the comb filter, sampling circuits 194, 195, and vertical detail processor 160 are provided from a source 198. The timing signals from source 198 are developed in response to a timing reference signal, e.g., a 10.7 MHz signal corresponding to a frequency multiplied version of the 3.58 MHz chrominance subcarrier reference signal frequency (NTSC standards).

The combed chrominance signal from terminal T8 is filtered by a bandpass filter 200 to provide chrominance signals within the chrominance frequency spectrum to chrominance signal processing circuits. Filter 200 illustratively exhibits a frequency response of 3.58 MHz±0.5 MHz for NTSC chrominance signals. The signal appearing at terminal T8 is also coupled to vertical detail signal processor 160 via a low pass (e.g., 0-1 MHz) vertical detail filter 202 and terminal T1. Filter 202 serves to extract from the combed chrominance signal the low frequency luminance signal vertical detail information which is missing from the combed luminance signal. After processing by processor 160 as discussed in connection with FIG. 1, a non-linearly processed vertical detail signal appears at terminal T2.

The combed luminance signal from terminal T7 is low pass filtered by a filter 205 having a 0-4 MHz frequency response corresponding to the luminance signal frequency spectrum. A signal combining network 208 receives the filtered luminance signal from filter 205, together with a non-linearly processed (i.e., cored, peaked and pared) vertical detail signal coupled via a low pass (0-10 MHz) filter 210 which removes harmonics generated by the non-linear signal processing, and a linear vertical detail signal component from the output of vertical detail filter 202. The latter signal is applied to combiner 208 in an amount sufficient to preserve normal low level vertical resolution in the luminance content of a displayed image. Specifically, the magnitude of the latter signal corresponds to that which is required to restore small amplitude excursions of the vertical detail signal (i.e., region I amplitude excursions) to the luminance signal so that an ultimately reconstituted luminance signal exhibits an essentially "flat" amplitude response with respect to small amplitude detail signals. Thus the output luminance signal from combiner 208, as coupled to luminance signal processing circuits, comprises a non-linearly processed vertical detail component exhibiting peaking and paring with respect to moderate and large amplitude excursions, respectively, and a restored "flat" amplitude characteristic with respect to small amplitude excursions.

What is claimed is:
1. Video signal processing apparatus comprising:
    a source of video signals exhibiting small signal amplitudes over a first range, moderate signal amplitudes over a second range beyond said first range, and large signal amplitudes over a third range beyond said second range;
    a first signal channel for conveying a linear version of video signals from said source with a given signal gain;
    a second signal channel for conveying video signals from said source with a given signal gain, said second channel including a first amplifier exhibiting linear and limiting regions;
    a third signal channel for conveying video signals from said source with a given signal gain, said third channel including a second amplifier exhibiting different linear and limiting regions compared to said first amplifier; and
    means for combining output signals from said first, second and third channels to produce an output video signal such that small, moderate, and large amplitude components of said video signal from said combining means are respectively provided with a first gain, a second gain greater than said first gain, and a third gain less than said second gain; wherein
    said first gain corresponds to a signal gain of substantially zero; and
    said third gain corresponds to a negative signal gain.

2. Video signal processing apparatus comprising:
- a source of video signals exhibiting small signal amplitudes over a first range, moderate signal amplitudes over a second range beyond said first range, and large signal amplitudes over a third range beyond said second range;
- a first signal channel for conveying a linear version of video signals from said source with a given signal gain;
- a second signal channel for conveying video signals from said source with a given signal gain, said second channel including a first amplifier exhibiting linear and limiting regions;
- a third signal channel for conveying video signals from said source with a given signal gain, said third channel including a second amplifier exhibiting different linear and limiting regions compared to said first amplifier; and
- means for combining output signals from said first, second and third channels to produce an output video signal; wherein
- said first and second amplifiers are arranged in cascade relationship wherein said second amplifier responds to output signals from said first amplifier.

3. Video signal processing apparatus comprising:
- a source of video signals exhibiting small signal amplitudes over a first range, moderate signal amplitudes over a second range beyond said first range, and large signal amplitudes over a third range beyond said second range;
- a first signal channel for conveying a linear version of video signals from said source with a given signal gain;
- a second signal channel for conveying video signals from said source with a given signal gain, said second channel including a first amplifier exhibiting linear and limiting regions;
- a third signal channel for conveying video signals from said source with a given signal gain, said third channel including a second amplifier exhibiting different linear and limiting regions compared to said first amplifier; and
- means for combining output signals from said first, second and third channels to produce an output video signal; wherein
- said first and second amplifiers exhibit substantially equal signal gains and are arranged in cascade relationship wherein said second amplifier responds to output signals from said first amplifier;
- said second channel includes a voltage divider network for providing an amplitude translated version of output signals from said first amplifier at an output of said second channel; and
- said third channel includes a voltage divider network for providing an amplitude translated version of output signals from said second amplifier at an output of said third channel.

* * * * *